(12) United States Patent
Law et al.

(10) Patent No.: US 8,827,074 B2
(45) Date of Patent: Sep. 9, 2014

(54) CASE FOR AN ELECTRONIC DEVICE AND METHOD OF PROVIDING AND USING THE SAME

(71) Applicant: Belkin International, Inc., Playa Vista, CA (US)

(72) Inventors: Henry Law, Orange, CA (US); Oliver Duncan Seil, Pasadena, CA (US); Juliana S. Hung, Pasadena, CA (US)

(73) Assignee: Belkin International, Inc., Playa Vista, CA (US)

( * ) Notice: Subject to any disclaimer, the term of this patent is extended or adjusted under 35 U.S.C. 154(b) by 0 days.

(21) Appl. No.: 13/752,114

(22) Filed: Jan. 28, 2013

(65) Prior Publication Data

US 2013/0140195 A1    Jun. 6, 2013

Related U.S. Application Data

(63) Continuation of application No. PCT/US2011/045787, filed on Jul. 28, 2011.

(60) Provisional application No. 61/368,605, filed on Jul. 28, 2010.

(51) Int. Cl.
| | | |
|---|---|---|
| *B65D 88/00* | (2006.01) | |
| *H04B 1/38* | (2006.01) | |
| *A45C 11/00* | (2006.01) | |

(52) U.S. Cl.
CPC ........... *A45C 11/00* (2013.01); *A45C 2011/002* (2013.01); *H04B 1/3888* (2013.01)
USPC ....... 206/320; 220/604; 220/4.02; 455/575.8; 455/575.2

(58) Field of Classification Search
CPC ..... H04M 1/6058; A45F 5/022; H02G 11/02; A45C 13/24; A45C 11/00; A45C 2011/002; H04B 1/3888
USPC ............ 220/602, 4.02; 264/328.1, 219; 455/575.8; 206/320; 379/437, 430, 379/441, 446; 242/171, 400.1, 385.4; 191/12 R, 12.4; 381/374
See application file for complete search history.

(56) References Cited

U.S. PATENT DOCUMENTS

| | | | | |
|---|---|---|---|---|
| 5,984,224 | A * | 11/1999 | Yang | 242/400.1 |
| 6,698,560 | B2 * | 3/2004 | Reardon et al. | 191/12 R |
| 6,942,173 | B1 * | 9/2005 | Abramov | 242/400.1 |
| D556,448 | S | 12/2007 | Brandenburg | |
| D565,291 | S | 4/2008 | Brandenburg et al. | |
| D618,231 | S * | 6/2010 | Fahrendorff et al. | D14/250 |
| 8,359,078 | B2 * | 1/2013 | Hung | 455/575.8 |
| 2003/0157973 | A1 | 8/2003 | Yang | |
| 2007/0165371 | A1 * | 7/2007 | Brandenburg | 361/683 |
| 2011/0031287 | A1 | 2/2011 | Le Gette et al. | |
| 2011/0095033 | A1 * | 4/2011 | Hung | 220/602 |

FOREIGN PATENT DOCUMENTS

EP    1885103    2/2008

OTHER PUBLICATIONS

International Search Report and Written Opinion for Application No. PCT/US2011/045787, Mar. 28, 2012.

* cited by examiner

*Primary Examiner* — Anthony Stashick
*Assistant Examiner* — James M Van Buskirk
(74) *Attorney, Agent, or Firm* — Bryan Cave LLP

(57) ABSTRACT

Some embodiments include a case for an electronic device. Other embodiments of related cases and methods of providing and using the same are disclosed.

20 Claims, 4 Drawing Sheets

CASE FOR AN ELECTRONIC DEVICE AND METHOD OF PROVIDING AND USING THE SAME

CROSS-REFERENCE TO RELATED APPLICATIONS

This application is a continuation of International Patent Application Serial No. PCT/US2011/045787, filed Jul. 28, 2011. International Patent Application Serial No. PCT/US2011/045787 claims the benefit of U.S. Provisional Application No. 61/368,605, filed Jul. 28, 2010. International Patent Application Serial No. PCT/US2011/045787 and U.S. Provisional Application No. 61/368,605 are incorporated herein by reference in their entirety.

FIELD OF THE INVENTION

This invention relates generally to cases for electronic devices, and relates more particularly to such cases that provide protection and/or stands for electronic devices while facilitating storage and/or organization of electrical cables and methods of providing and using the same.

DESCRIPTION OF THE BACKGROUND

A case can protect an electronic device from superficial damage (e.g., scratches, etc.) and/or more serious damage resulting from impacts, etc. A case can also help to keep clean the electronic device. These advantages, and others, can be particularly relevant where the electronic device is small and/or fragile by design, such as is frequently the case when the electronic device is a mobile electronic device.

Meanwhile, the electronic device may be configured to be coupled with one or more electrical cables (e.g., an electrical cable for head phones, an electrical cable for coupling the electronic device with one or more other electronic devices, an electrical cable for charging the electronic device, etc.). Frequently, when the electronic device is coupled with the electrical cable(s), the one or more electrical cables are left to hang freely from the electronic device, resulting in undesirable cluttering, tangling, snagging, etc. of the electrical cable(s).

Accordingly, a need or potential for benefit exists for a case for an electronic device that provides protection for the electronic device while also facilitating storage and/or organization of one or more electrical cables and methods of providing and using the same.

BRIEF DESCRIPTION OF THE DRAWINGS

To facilitate further description of the embodiments, the following drawings are provided in which.

Figure 1:
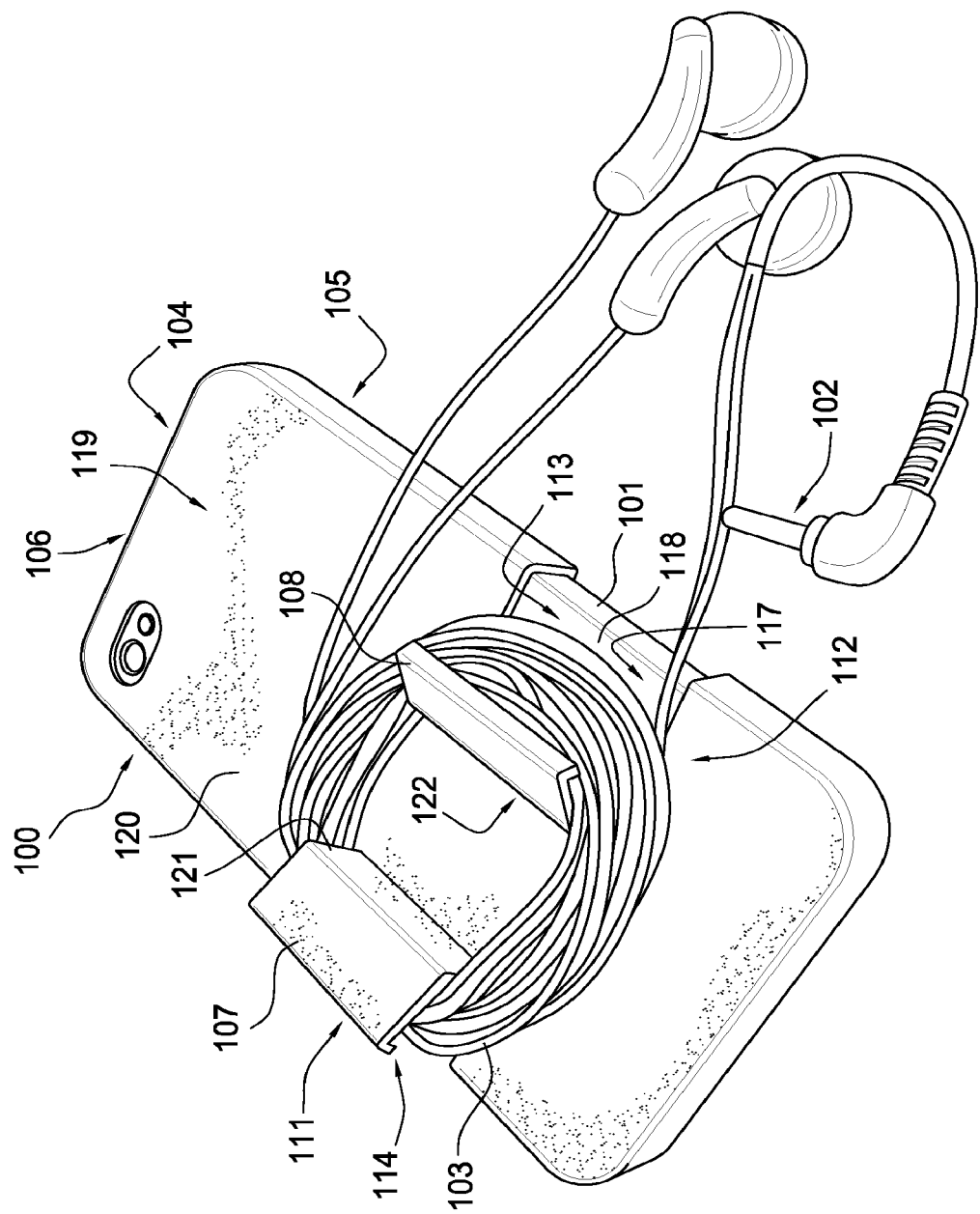
FIG. 1 illustrates a case for an electronic device, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

The term "mobile electronic device" as used herein refers to at least one of a digital music player, a digital video player, a digital music and video player, a cellular telephone (e.g., smart telephone), a personal digital assistant, a handheld digital computer (e.g., a calculator, a tablet personal computer, a netbook computer, a portable gaming console, or another device with the capability to display images and/or videos. For example, a mobile electronic device can comprise the iPod®, iPhone®, iTouch®, or iPad® product by Apple Inc. of Cupertino, Calif. Likewise, a mobile electronic device can comprise a Blackberry® product by Research in Motion (RIM) of Waterloo, Ontario, Canada, or a different product by a different manufacturer.

DETAILED DESCRIPTION OF EXAMPLES OF EMBODIMENTS

Some embodiments include a case for an electronic device. The electronic device can be configured to receive an electrical connector of an electrical cable at an electrical receptacle of the electronic device. The case comprises a housing configured to protect the electronic device. The housing comprises a wall, a first receiver, and a second receiver. The first receiver can comprise a first interior receiver surface, and the second receiver comprises a second interior receiver surface. Meanwhile, the first receiver can be configured to be moveable between a first active position and a first inactive position, and the second receiver can be configured to be moveable between a second active position and a second inactive position. When the first receiver is in the first active position and the second receiver is in the second active position, the first interior receiver surface and second interior receiver surface can be configured so as to permit the electrical cable to be wound about the first receiver and the second receiver at the first interior receiver surface and the second interior receiver surface. At least one of (a) the first interior receiver surface can be adjacent to the electronic device when the first receiver is in the first inactive position or (b) the second interior receiver surface can be adjacent to the electronic device when the second receiver is in the second inactive position.

Various embodiments include a method of providing a case for an electronic device. The electronic device can be configured to receive an electrical connector of an electrical cable at an electrical receptacle of the electronic device. The method can comprise providing a housing configured to protect the electronic device. The housing can comprise a wall, a first receiver, and a second receiver. Likewise, the first receiver can comprise a first interior receiver surface, and the second receiver can comprise a second interior receiver surface. Meanwhile, the first receiver can be configured to be moveable between a first active position and a first inactive position, and the second receiver can be configured to be moveable between a second active position and a second inactive position. When the first receiver is in the first active position and the second receiver is in the second active position, the first interior receiver surface and second interior receiver surface can be configured so as to permit the electrical cable to be wound about the first receiver and the second receiver at the first interior receiver surface and the second interior receiver surface. At least one of (a) the first interior receiver surface can be adjacent to the electronic device when the first receiver is in the first inactive position or (b) the second interior receiver surface can be adjacent to the electronic device when the second receiver is in the second inactive position.

Further embodiments include a method for storing an electrical cable at a housing of a case for an electronic device. The electronic device can be configured to receive an electrical connector of the electrical cable at an electrical receptacle of the electronic device. The method can comprise: moving a first receiver of the housing of the case for the electronic device from a first inactive position to a first active position, wherein the first receiver is adjacent to the electronic device when the first receiver is in the first inactive position; moving a second receiver of the housing of the case for the electronic device from a second inactive position to a second active position, wherein the second receiver is adjacent to the electronic device when the second receiver is in the second inactive position; and winding the electrical cable about the first receiver at a first interior receiver surface of the first receiver and about the second receiver at a second interior receiver surface of the second receiver such that the electrical cable is received at the housing.

Turning to the drawings, FIG. 1 illustrates case 100 for electronic device 101, according to an embodiment of case 100. Case 100 is merely exemplary and is not limited to the embodiments presented herein. Case 100 can be employed in many different embodiments or examples not specifically depicted or described herein. Case 100 can be coupled to electronic device 101. Accordingly, FIG. 1 illustrates case 100 coupled to electronic device 101.

Electronic device 101 can be configured to receive electrical connector 102 of electrical cable 103 at electrical receptacle 104 of electronic device 101. Electronic device 101 can comprise one or more external surfaces 117, and external surface(s) 117 can comprise first external surface 118. In many embodiments, electronic device 101 can comprise a mobile electronic device, as described above. Electrical cable 103 can be a stand-alone electrical cable configured to couple together multiple electronic devices comprising electronic device 101. In other embodiments, electrical cable 103 can be part of a head phone or head set device configured to be coupled with electronic device 101. In still other embodiments, electrical cable 103 can be configured to pass electricity (e.g., to charge) electronic device 101. Meanwhile, electrical connector 102 can comprise any suitable connector for coupling electrical cable 103 to electronic device 101 (e.g., a high-definition multimedia interface (HDMI) cable, a digital visual interface (DVI) cable, a display port (DP) cable, a video graphics array (VGA) cable, composite cables, an S-Video cable, an optical audio cable, a universal serial bus (USB) cable, Radio Corporation of America (RCA) cables, a tip-ring-sleeve (TRS) cable such as a 3.5 millimeter TRS cable, a dock connector such a 30-pin dock connector by Apple Inc. of Cupertino, Calif., etc.).

Case 100 comprises housing 105. Case 100 and/or housing 105 can be configured to protect and/or keep clean electronic device 101. Still, it should be understood that the ability of case 100 and/or housing 105 to protect and/or keep clean electronic device 101 is relative, and may vary from one case 100 to another depending on the material composition of case 100, the amount of contact between case 100 and electronic device 101, the thickness of case 100, etc. Indeed, for the purposes of this disclosure, the ability of case 100 and/or housing 105 to literally protect and/or keep clean electronic device 101 should not be interpreted as limiting, provided case 100 is at least being used with such intent in mind. In many embodiments, a pocket or opening of housing 105 can be shaped and/or dimensioned similarly to electronic device 101 and/or can be configured such that interior wall surface(s) 216 (FIG. 2), as described below, of the pocket or opening are adjacent to and/or conform to one or more of external surface(s) 117 of electronic device 101 when case 100 and/or housing 105 is protecting and/or keeping clean electronic device 101.

Accordingly, housing 105 comprises wall 106, first receiver 107, and second receiver 108. Wall 106 comprises at least one exterior wall surface 119. Exterior wall surface(s) 119 can comprise first exterior wall surface 120. Meanwhile, first receiver 107 comprises first exterior receiver surface 121, and/or second receiver 108 comprises second exterior receiver surface 122. FIG. 1 illustrates first receiver 107 in first active position 111 and second receiver 108 in second active position 112.

Meanwhile, housing 105 comprises first receiver aperture 113 and/or second receiver aperture 114. In many embodiments, housing 105 can comprise one or more electronic device features. The electronic device feature(s) can comprise: (a) one or more apertures configured to permit access to and/or to expose one or more electrical receptacles (e.g., electrical receptacle 104) and/or one or more audio-visual components (e.g., an electronic display, a speaker, a microphone, a camera, etc.) of electronic device 101 and/or (b) one or more input mechanisms (e.g., buttons, switches, etc.) configured to operate at least some of the functionality of electronic device 101, when case 100 and/or housing 105 is protecting and/or keeping clean electronic device 101. In various embodiments, case 100 can be configured for use with a particular electronic device 101. In these embodiments, the electronic device feature(s) of case 100 can be tailored to be appropriate for electronic device 101.

Figure 2:
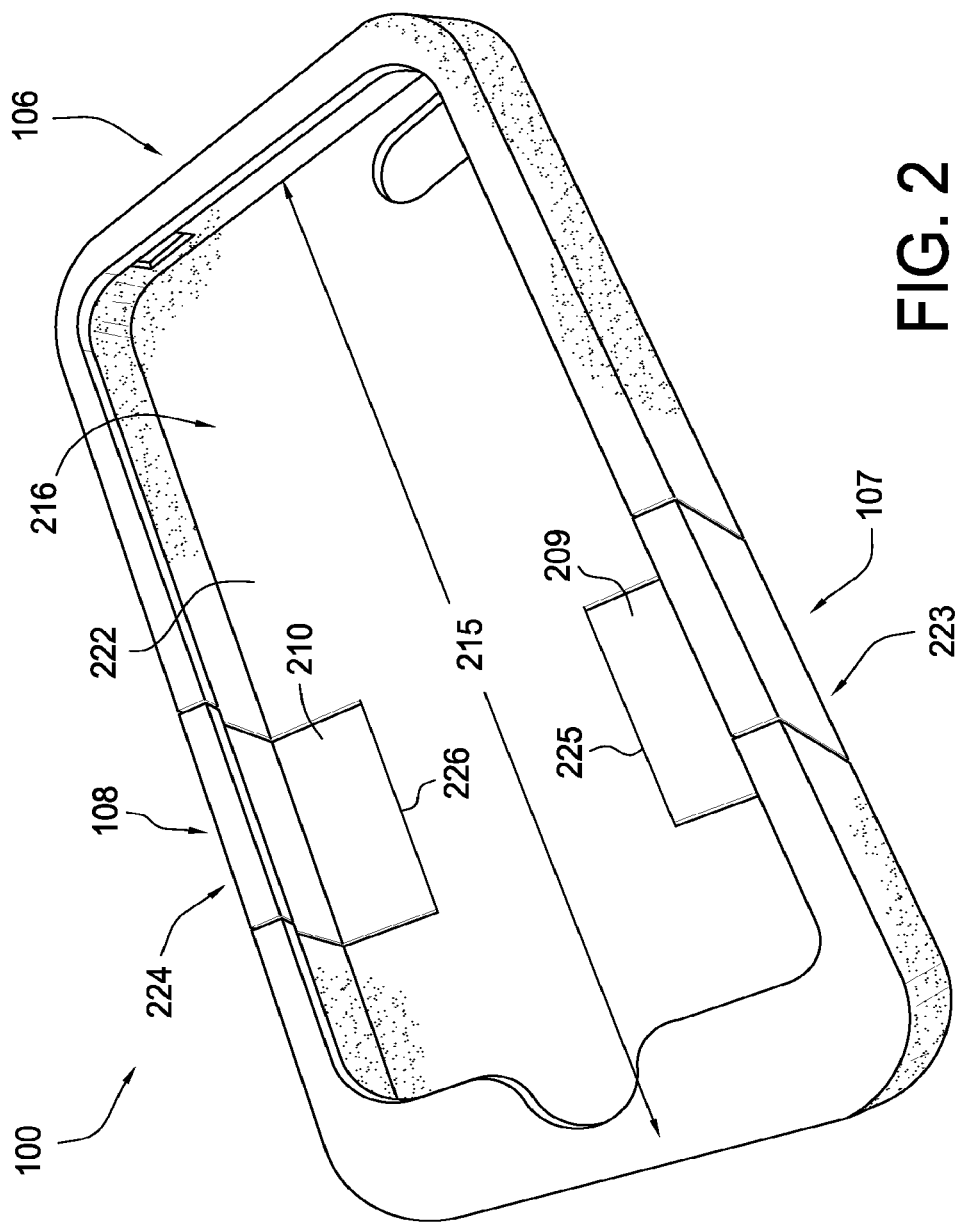
FIG. 2 illustrates the embodiment of the case of FIG. 1 from another viewpoint.

Turning to the next figure, FIG. 2 illustrates the embodiment of case 100 of FIG. 1 from another viewpoint. As opposed to FIG. 1, FIG. 2 illustrates case 100 while case 100 is not coupled with electronic device 101 (FIG. 1). With reference to FIG. 2, first receiver 107 (FIG. 1) comprises first interior receiver surface 209, and/or second receiver 108 (FIG. 1) comprises second interior receiver surface 210. Meanwhile, wall 106 (FIG. 1) comprises at least one interior wall surface 216, and interior wall surface(s) 216 can comprise first interior wall surface 222. As described above, interior wall surface(s) 216 can be configured to be adjacent to and/or to conform to external surface(s) 117 of electronic device 101 when case 100 and/or housing 105 is protecting and/or keeping clean electronic device 101. Also, case 100 and/or wall 105 can comprise first hinge 225 and/or second hinge 226, as described below. FIG. 2 illustrates first receiver 107 (FIG. 1) in first inactive position 223 and second receiver 108 (FIG. 1) in second inactive position 224.

Returning now to FIG. 1, housing 105, wall 106, first receiver 107, and/or second receiver 108 each can comprise a material. In some embodiments, the material can be the same or different for some or all of housing 105, wall 106, first receiver 107, and/or second receiver 108. In many embodiments, the material can comprise thermoplastic polyurethane (TPU), silicone, polycarbonate (PC), acrylonitrile butadiene styrene (ABS), aluminum, iron, leather, synthetic leather, woven fabric, and/or any other suitable polymer, metal, and/or ceramic material.

In some embodiments, each of exterior wall surface(s) 119 can be opposite interior wall surface(s) 216 (FIG. 2). In these embodiments, first exterior wall surface 120 can be opposite first interior wall surface 222 (FIG. 2).

In operation and as described above, case 100 and/or housing 105 can provide protection for and/or keep clean electronic device 101. Meanwhile, case 100 and/or housing 105 can also be configured to provide storage and/or organization for electrical cable 103 while protecting and/or keeping clean electronic device 101. For example, when first receiver 107 is in first active position 111 and second receiver 108 is in second active position 112, first interior receiver surface 209 (FIG. 2) and/or second interior receiver surface 210 (FIG. 2) can be configured so as to permit electrical cable 103 to be wound about first receiver 107 and/or second receiver 108 at first interior receiver surface 209 (FIG. 2) and/or second interior receiver surface 210 (FIG. 2).

In many embodiments, when case 100 and/or housing 105 are not presently providing storage and/or organization for electrical cable 103 while protecting and/or keeping clean electronic device 101, case 100 and/or housing 105 can be configured such that the manner of storage and/or organization does not disrupt the appearance, shape, and/or feel of case 100 and/or housing 105. Accordingly, in various examples, first receiver 107 can be configured to be moveable and/or to be adjusted between first active position 111 (e.g., during use) and first inactive position 223 (FIG. 2) (e.g., when not being used). Likewise, second receiver 108 can be configured to be moveable and/or to be adjusted between second active position 112 (e.g., during use) and second inactive position 224 (FIG. 2) (e.g., when not being used). For illustrative purposes, in some embodiments, when first receiver 107 is in first active position 111, first receiver 107 can be in an open configuration. The same can be true for when second receiver 108 is in second active position 112. Meanwhile, in the same or different embodiments, when first receiver 107 is in first inactive position 223 (FIG. 2), first receiver 107 can be in a closed configuration. Once again, the same can be true for when second receiver 108 is in second inactive position 224 (FIG. 2).

In order to prevent first receiver 107 and/or second receiver 108 from disrupting the appearance, shape, and/or feel of case 100 and/or housing 105, in various embodiments, first interior receiver surface 209 (FIG. 2) can be and/or can be configured to be adjacent and/or to conform to electronic device 101 when first receiver 107 is in first inactive position 223 (FIG. 2) and when case 100 and/or housing 105 is protecting and/or keeping clean electronic device 101. In the same or different embodiments, second interior receiver surface 210 (FIG. 2) can be and/or can be configured to be adjacent and/or to conform to electronic device 101 when second receiver 108 is in second inactive position 224 (FIG. 2) and when case 100 and/or housing 105 is protecting and/or keeping clean electronic device 101.

In these or other embodiments, when case 100 and/or housing 105 are protecting and/or keeping clean electronic device 101, first exterior receiver surface 121 of first receiver 107 can be approximately flush and/or can be configured to be approximately flush with first exterior wall surface 120 when first receiver 107 is in first inactive position 223 (FIG. 2), and/or second exterior receiver surface 122 of the second receiver 108 can be approximately flush and/or can be configured to be approximately flush with first exterior wall 120 when second receiver 108 is in second inactive position 224 (FIG. 2). Likewise, in these or other embodiments, when case 100 and/or housing 105 are protecting and/or keeping clean electronic device 101, first interior receiver surface 209 (FIG. 2) of first receiver 107 can be approximately flush and/or can be configured to be approximately flush with first interior wall surface 222 (FIG. 2) when first receiver 107 is in first inactive position 223 (FIG. 2), and/or second interior receiver surface 210 (FIG. 2) of the second receiver 108 can be approximately flush and/or can be configured to be approximately flush with first interior wall surface 222 (FIG. 2) when second receiver 108 is in second inactive position 224 (FIG. 2). In still other embodiments, when case 100 and/or housing 105 are protecting and/or keeping clean electronic device 101, first exterior receiver surface 121 of first receiver 107 may not be flush with first exterior wall surface 120 when first receiver 107 is in first inactive position 223 (FIG. 2), and/or second exterior receiver surface 122 of the second receiver 108 may not be flush with first exterior wall surface 120 when second receiver 108 is in second inactive position 224 (FIG. 2), if being other than flush would accommodate a design and/or shape of case 100 and/or housing 105, for example, where first exterior wall surface 120 is textured or comprises analogous surface features. In any event, first exterior receiver surface 121 and/or second exterior receiver surface 122 can be configured to correspond to first exterior wall surface 120.

In various embodiments, first receiver aperture 113 can be configured to receive first receiver 107 when first receiver 107 is in first inactive position 201 (FIG. 2). Likewise, second receiver aperture 114 can be configured to receive second receiver 108 when second receiver 108 is in second inactive position 202 (FIG. 2). By receiving first receiver 107 and/or second receiver 108, first receiver aperture 113 and/or second receiver aperture 114 can facilitate preventing first receiver 107 and/or second receiver 108 from disrupting the appearance, shape, and/or feel of case 100 and/or housing 105. Accordingly, in some embodiments, first receiver 107 can comprise and/or be a first receiver shape, and second receiver 108 can comprise and/or be a second receiver shape.

In these embodiments, first receiver aperture 113 can be approximately defined by the first receiver shape, and/or second receiver aperture 114 can be approximately defined by the second receiver shape. Still, in other embodiments, first receiver aperture 113 can comprise and/or define another shape than the first receiver shape, and/or second receiver aperture 114 can comprise and/or define another shape than the second receiver shape. Furthermore, the first receiver shape and the second receiver shape may be the same or different from each other. Meanwhile, in the same or different embodiments, first receiver aperture 113 and second receiver aperture 114 may comprise a same shape or a different shape from each other.

In some embodiments, first receiver 107 and/or second receiver 108 each may comprise a single panel, in which case, the single panel of each of first receiver 107 and/or second receiver 108 may correspond to only one external surface of external surface(s) 117 (e.g., first external surface 118), one exterior wall surface of exterior wall surface(s) 119 (e.g., first exterior wall surface 120), and/or one interior wall surface of interior wall surface(s) 216 (FIG. 2) (e.g., first interior wall surface 222 (FIG. 2)). In these or other embodiments, the external surface of external surface(s) 117 and/or first external surface 118 can comprise a back surface of electronic device 101. In other embodiments, first receiver 107 and/or second receiver 108 each may comprise a set of multiple panels, in which case each set of multiple panels may correspond to multiple external surfaces of external surface(s) 117 (e.g., comprising first external surface 118), multiple exterior wall surfaces of exterior wall surface(s) 119 (e.g., comprising first exterior wall surface 120), and/or multiple interior wall surfaces of interior wall surface(s) 216 (FIG. 2) (e.g., comprising first interior wall surface 222 (FIG. 2)). For example, where first receiver 107 and/or second receiver 108 each comprise the set of multiple panels, each set of multiple panels may comprise a first panel corresponding to one external surface of external surface(s) 117 (e.g., first external surface 118), one exterior wall surface of exterior wall surface(s) 119 (e.g., first exterior wall surface 120), and/or one interior wall surface of interior wall surface(s) 216 (FIG. 2) (e.g., first interior wall surface 216 (FIG. 2)) and at least one other panel corresponding to another external surface of external surface(s) 117, another exterior wall surface of exterior wall surface(s) 119, and/or another interior wall surface of interior wall surface(s) 216 (FIG. 2), respectively. In these or other embodiments, the first panel can be similar or identical to the single panel described above in this paragraph. Meanwhile, the other panel(s) of each of first receiver 107 and/or second receiver 108 may not necessarily correspond to the same external surface(s) 117, exterior wall surface(s) 119, and/or interior wall surface(s) 216 (FIG. 2). For further purposes of illustration, the other panel(s) may each correspond to opposing side walls of wall 106 of housing 105. Thus, in some embodiments, the first panel of each set of the multiple panels of first receiver 107 and/or second receiver 108 can be configured orthogonally to a second panel (e.g., the respective side wall portion of wall 106 of housing 105) of the other panel(s) of each set of the multiple panels of first receiver 107 and/or second receiver 108. When first receiver 107 and/or second receiver 108 each comprise the set of multiple panels, the other panel(s) can help prevent electrical cable 103 from slipping off of first receiver 107 and/or second receiver 108 when electrical cable 103 is wound about first receiver 107 and/or second receiver 108.

In various embodiments, one or both of first receiver 107 and second receiver 108 can be integral with wall 106 of housing 105. In other embodiments, one or both of first receiver 107 and second receiver 108 can be coupled to wall 106 of housing 105. Whether integral with or coupled to wall 106 of housing 105, the locations at which first receiver 107 and/or second receiver 108 are integrated with or coupled with wall 106 of housing 105, respectively, can comprise first hinge 225 (FIG. 2) and/or second hinge 226 (FIG. 2), respectively, of case 100 and/or housing 105. For example, when first receiver 107 and/or second receiver 108 are integral with wall 106 of housing 105, first hinge 225 (FIG. 2) and/or second hinge 226 (FIG. 2) each can comprise a living hinge. In other examples, when first receiver 107 and/or second receiver 108 are coupled with wall 106 of housing 105, first hinge 225 (FIG. 2) and/or second hinge 226 (FIG. 2) each can comprise any one of a barrel hinge, a pivot hinge, a strap hinge, etc.

Returning briefly again to FIG. 2, in some embodiments, first receiver 107 and second receiver 108 can be symmetric about and/or equidistant to centerline length 215 of housing 105 (FIG. 1). In other embodiments, first receiver 107 (FIG. 1) and/or second receiver 108 (FIG. 1) can be located at other positions with respect to housing 105 (FIG. 1). Accordingly, in these embodiments, first receiver 107 (FIG. 1) and/or second receiver 108 (FIG. 1) may not be symmetric about and/or equidistant to centerline length 215. In some examples, first receiver 107 (FIG. 1) and/or second receiver 108 (FIG. 1) may be positioned with respect to a centerline width (not shown) of housing 105 (FIG. 1) instead of or in addition to being positioned with respect to centerline length 215.

Figure 3:
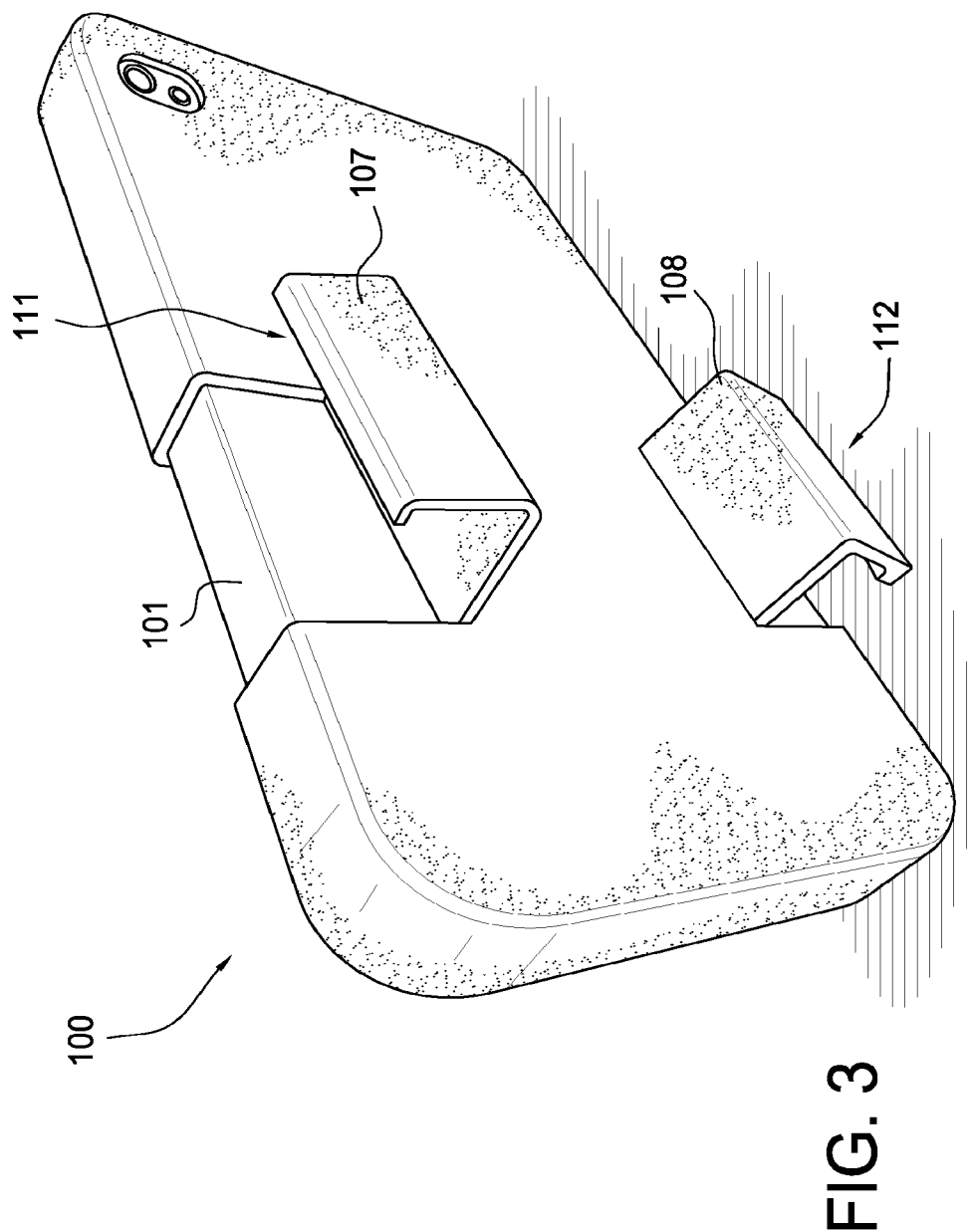
FIG. 3 illustrates the embodiment of the case of FIG. 1 operating as a stand.

Next, FIG. 3 illustrates an embodiment of case 100 of FIG. 1 operating as a stand. Accordingly, in many embodiments, case 100 (FIG. 1) can provide a stand for electronic device 101 (FIG. 1) when case 100 is coupled to electronic device 101 (FIG. 1) and/or when housing 105 (FIG. 1) is protecting and/or keeping clean electronic device 101 (FIG. 1). In some embodiments, first receiver 107 (FIG. 1) or second receiver 108 (FIG. 1) can be configured to operate as the stand for case 100 (FIG. 1) when first receiver 107 (FIG. 1) is in first active position 111 (FIG. 1) or second receiver 108 (FIG. 1) is in second active position 112 (FIG. 1), respectively. In various embodiments, case 100 (FIG. 1) can provide the stand for electronic device 101 (FIG. 1) while simultaneously providing storage and/or organization for electrical cable 103 (FIG. 1).

With reference to FIGS. 1-3, it should be understood that while case 100 is described and illustrated as comprising two receivers (e.g., first receiver 107 and second receiver 108), in various embodiments, case 100 (FIG. 1) could comprise more or less receivers, as desirable. In those embodiments where case 100 (FIG. 1) comprises additional receivers, the additional receivers comprising first receiver 107 (FIG. 1) and/or second receiver 108 (FIG. 1), the additional receivers may be used to store only one electrical cable (e.g., electrical cable 103) and/or multiple electrical cables comprising electrical cable 103.

Figure 4:
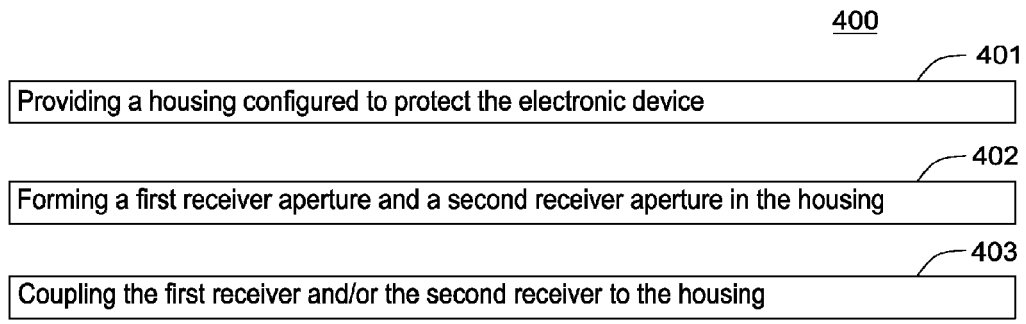
FIG. 4 illustrates a flow chart for an embodiment of a method of providing a case for an electronic device.

FIG. 4 illustrates a flow chart for an embodiment of method 400 of providing a case for an electronic device. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of the method 400 can be performed in any other suitable order. In still other embodiments, one or more of the procedures, the processes, and/or the activities in method 400 can be combined or skipped. The case can be similar or identical to case 100 (FIG. 1). Meanwhile, the electronic device can be similar or identical to electronic device 101 (FIG. 1).

Referring to FIG. 4, method 400 can comprise procedure 401 of providing a housing configured to protect the electronic device. The housing can be similar or identical to housing 105 (FIG. 1).

Method 400 can continue with procedure 402 of forming a first receiver aperture and a second receiver aperture in the housing. The first receiver aperture can be similar or identical to first receiver aperture 223 (FIG. 2). Likewise, the second receiver aperture can be similar or identical to second receiver aperture 224 (FIG. 2). In some embodiments, forming the first receiver aperture and the second receiver aperture in the housing can comprise forming (e.g., molding, cutting, etc.) a first receiver and a second receiver at the housing. Accordingly, in some embodiments, the first receiver and/or the second receiver can originally be part of the housing and may remain integral with the housing after formation or may be removed from and subsequently coupled with the housing. In other embodiments, the first receiver and/or the second receiver can be formed separately and coupled with the housing. In these other embodiments, as an example, procedures 401 and 402 can be performed simultaneously with each other. The first receiver can be similar or identical to first receiver 107 (FIG. 1) and/or the second receiver can be similar or identical to second receiver 108 (FIG. 1).

In some embodiments, method 400 can comprise procedure 403 of coupling the first receiver and/or the second receiver to the housing. In these embodiments, procedure 403 can be performed after procedures 401 and 402. Likewise, in these embodiments, procedure 403 of coupling the first receiver and/or the second receiver to the housing can be performed in a similar or identical manner to that described above with respect to case 100 (FIG. 1).

Figure 5:
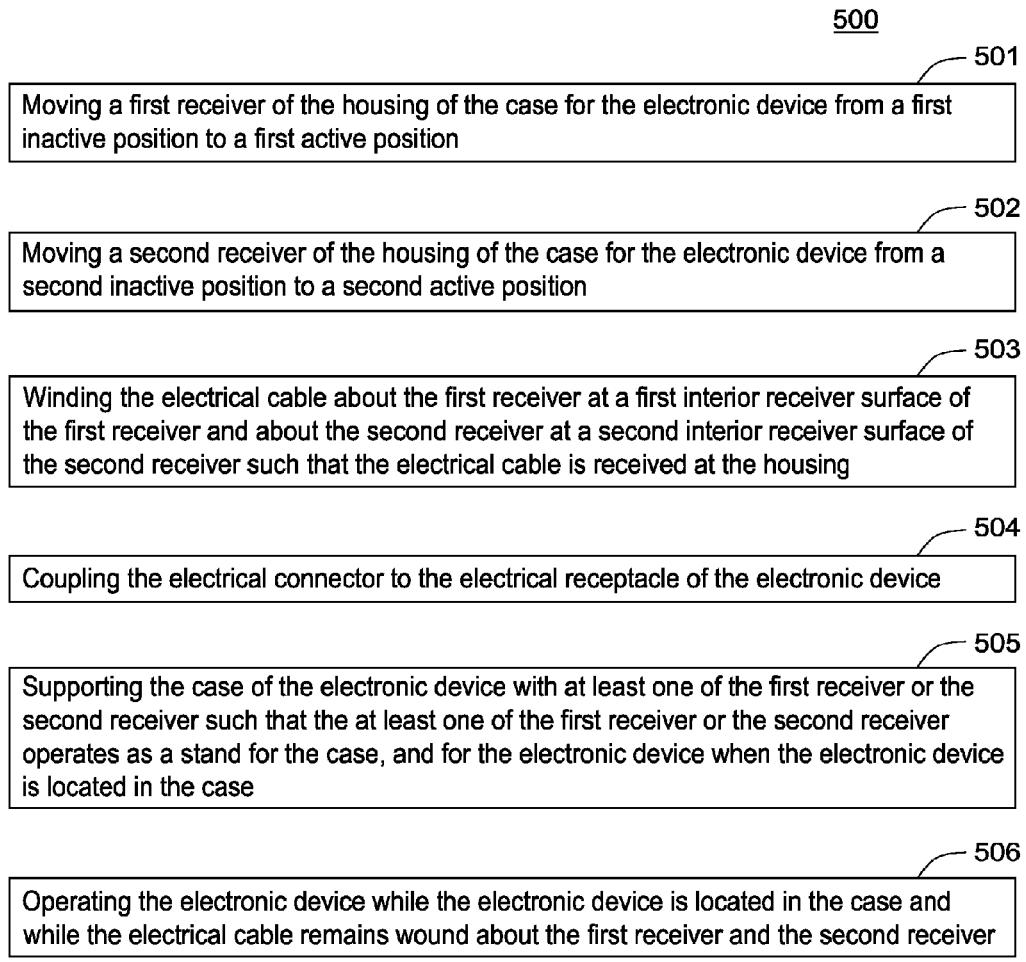
FIG. 5 illustrates a flow chart for an embodiment of a method for storing an electrical cable at a housing of a case for an electronic device.

FIG. 5 illustrates a flow chart for an embodiment of method 500 for storing an electrical cable at a housing of a case for an electronic device. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of the method 500 can be performed in any other suitable order. In still other embodiments, one or more of the procedures, the processes, and/or the activities in method 500 can be combined or skipped. The electrical cable can be similar or identical to electrical cable 103 (FIG. 1). The housing can be similar or identical to housing 105 (FIG. 1). The case can be similar or identical to case 100 (FIG. 1). The electronic device can be similar or identical to electronic device 101 (FIG. 1).

Referring to FIG. 11, method 500 can comprise procedure 501 of moving a first receiver of the housing of the case for the electronic device from a first inactive position to a first active position. In some embodiments, procedure 501 can comprise pivoting the first receiver about a first receiver hinge such that at least part of the first receiver is located outside of a first receiver aperture of the housing configured to receive the first aperture when the first receiver is in the first inactive position. The first receiver can be similar or identical to first receiver 107 (FIG. 1). The first inactive position can be similar or identical to first inactive position 223 (FIG. 2), and/or the first active position can be similar or identical to first active position 111 (FIG. 1).

Method 500 can comprise procedure 502 of moving a second receiver of the housing of the case for the electronic device from a second inactive position to a second active position. In some embodiments, procedure 502 can comprise pivoting the second receiver about a second receiver hinge such that at least part of the second receiver is located outside of a second receiver aperture of the housing configured to receive the second aperture when the second receiver is in the second inactive position. The second receiver can be similar or identical to second receiver 108 (FIG. 1). The second inactive position can be similar or identical to second inactive position 224 (FIG. 2), and/or the second active position can be similar or identical to second active position 112 (FIG. 1).

Method 500 can comprise procedure 503 of winding the electrical cable about the first receiver at a first interior receiver surface of the first receiver and about the second receiver at a second interior receiver surface of the second receiver such that the electrical cable is received at the housing. The first interior receiver surface can be similar or identical to first interior receiver surface 209 (FIG. 2), and/or the second interior receiver surface can be similar or identical to second interior receiver surface 210 (FIG. 2). In some embodiments, procedure 503 can be performed before or after procedure 501 and/or procedure 502.

Method 500 can comprise procedure 504 of coupling the electrical connector to the electrical receptacle of the electronic device. In some embodiments, procedure 504 can be performed before or after procedure 501, procedure 502, and/or procedure 503.

Method 500 can comprise procedure 505 of supporting the case of the electronic device with at least one of the first receiver or the second receiver such that the at least one of the first receiver or the second receiver operates as a stand for the case, and for the electronic device when the electronic device is located in the case. In some embodiments, procedure 505 can be performed after performing one or more of procedures 501-504.

Method 500 can comprise procedure 506 of operating the electronic device while the electronic device is located in the case and while the electrical cable remains wound about the first receiver and the second receiver. In some embodiments, procedure 506 can be performed simultaneously with or after performing any one or combination of procedure 501-505.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that procedures 401-403 of method 400 (FIG. 4) and procedure 501-506 of method 500 (FIG. 5) may be comprised of many different procedures, processes, and activities and be performed by many different modules, in many different orders, that any element of FIGS. 1-5 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A case for an electronic device, the electronic device being configured to receive an electrical connector of an electrical cable at an electrical receptacle of the electronic device, the case comprising:
   a housing configured to protect the electronic device, the housing comprising a wall, a first receiver, and a second receiver;
   wherein:
     the first receiver comprises a first interior receiver surface;
     the second receiver comprises a second interior receiver surface;
     the first receiver is configured to be moveable, separately from the second receiver, between a first active position and a first inactive position;
     the second receiver is configured to be moveable, separately from the first receiver and so that the second receiver is able to be moved at different times than the first receiver, between a second active position and a second inactive position;
     when the first receiver is in the first active position and the second receiver is in the second active position, the first interior receiver surface and second interior receiver surface are configured so as to permit the electrical cable to be wound about the first receiver and the second receiver at the first interior receiver surface and the second interior receiver surface; and
     at least one of (a) the first interior receiver surface is adjacent to and faces towards the electronic device when the first receiver is in the first inactive position or (b) the second interior receiver surface is adjacent to and faces towards the electronic device when the second receiver is in the second inactive position.

2. The case of claim 1 wherein:
   the wall comprises at least one interior wall surface configured to be adjacent to at least one external surface of the electronic device when the housing is protecting the electronic device;
   the at least one external surface of the electronic device comprises a first external surface of the electronic device; and
   when the housing is protecting the electronic device, at least one of (a) the first interior receiver surface of the first receiver is configured to conform to the first external surface of the electronic device when the first receiver is in the first inactive position or (b) the second interior receiver surface of the second receiver is configured to conform to the first external surface of the electronic device when the second receiver is in the second inactive position.

3. The case of claim 1 wherein:
   the wall comprises at least one exterior wall surface;
   the at least one exterior wall surface comprises a first exterior wall surface;
   the first receiver comprises a first exterior receiver surface;
   the second receiver comprises a second exterior receiver surface; and
   when the housing is protecting the electronic device, at least one of (a) the first exterior receiver surface of the first receiver is configured to be flush with the first exterior wall surface when the first receiver is in the first inactive position or (b) the second exterior receiver surface of the second receiver is configured to be flush with the first exterior wall surface when the second receiver is in the second inactive position.

4. The case of claim 1 wherein:
   the housing further comprises a first receiver aperture and a second receiver aperture;
   the first receiver aperture is configured to receive all of the first receiver when the first receiver is in the first inactive position; and
   the second receiver aperture is configured to receive all of the second receiver when the second receiver is in the second inactive position.

5. The case of claim 4 wherein:
   an entirety of the first receiver has a first receiver shape;
   an entirety of the second receiver has a second receiver shape;
   the first receiver aperture is approximately defined by the first receiver shape; and
   the second receiver aperture is approximately defined by the second receiver shape.

6. The case of claim 1 wherein:
   the first receiver is one of (a) hingedly integral with the wall of the housing or (b) hingedly coupled to the wall of the housing; and
   the second receiver is one of (a) hingedly integral with the wall of the housing or (b) hingedly coupled to the wall of the housing.

7. The case of claim 1 wherein:
   at least one of the first receiver or the second receiver is configured to operate as a stand for the case when at least one of (a) the first receiver is in the first active position or (b) the second receiver is in the second active position.

8. The case of claim 1 wherein at least one of:
   the housing comprises a centerline length and a centerline width, and the first receiver and the second receiver are symmetric about and equidistant to the centerline length of the housing; or
   the housing comprises a material, and the material comprises at least one of thermoplastic polyurethane, silicone, polycarbonate, acrylonitrile butadiene styrene, aluminum, iron, leather, synthetic leather, or woven fabric.

9. A method of providing a case for an electronic device, the electronic device being configured to receive an electrical connector of an electrical cable at an electrical receptacle of the electronic device, the method comprising:
   providing a housing configured to protect the electronic device, the housing comprising a wall, a first receiver, and a second receiver;
   wherein:
     the first receiver comprises a first interior receiver surface;
     the second receiver comprises a second interior receiver surface;

the first receiver is configured to be moveable, separately from the second receiver, between a first active position and a first inactive position;

the second receiver is configured to be moveable, separately from the first receiver and so that the second receiver is able to be moved at different times than the first receiver, between a second active position and a second inactive position;

when the first receiver is in the first active position and the second receiver is in the second active position, the first interior receiver surface and second interior receiver surface are configured so as to permit the electrical cable to be wound about the first receiver and the second receiver at the first interior receiver surface and the second interior receiver surface; and at least one of (a) the first interior receiver surface is adjacent and faces towards to the electronic device when the first receiver is in the first inactive position or (b) the second interior receiver surface is adjacent to and faces towards the electronic device when the second receiver is in the second inactive position.

10. The method of claim 9 wherein at least one of:

the wall comprises at least one interior wall surface configured to be adjacent to at least one external surface of the electronic device when the housing is protecting the electronic device, the at least one external surface of the electronic device comprises a first external surface of the electronic device, and when the housing is protecting the electronic device, at least one of (a) the first interior receiver surface of the first receiver is configured to conform to the first external surface of the electronic device when the first receiver is in the first inactive position or (b) the second interior receiver surface of the second receiver is configured to conform to the first external surface of the electronic device when the second receiver is in the second inactive position; or the wall comprises at least one exterior wall surface, the at least one exterior wall surface comprises a first exterior wall surface, the first receiver comprises a first exterior receiver surface, the second receiver comprises a second exterior receiver surface, and when the housing is protecting the electronic device, at least one of (a) the first exterior receiver surface of the first receiver is configured to be flush with the first exterior wall surface when the first receiver is in the first inactive position or (b) the second exterior receiver surface of the second receiver is configured to be flush with the first exterior wall surface when the second receiver is in the second inactive position.

11. The method of claim 10 further comprising:

forming a first receiver aperture and a second receiver aperture in the housing;

wherein:

the first receiver aperture is configured to receive the first receiver when the first receiver is in the first inactive position; and the second receiver aperture is configured to receive the second receiver when the second receiver is in the second inactive position.

12. The method of claim 11 wherein:

an entirety of the first receiver has a first receiver shape;

an entirety of the second receiver has a second receiver shape;

the first receiver aperture is approximately defined by the first receiver shape; and the second receiver aperture is approximately defined by the second receiver shape.

13. The method of claim 9 wherein:

the first receiver is one of (a) hingedly integral with the wall of the housing or (b) hingedly coupled to the wall of the housing; and the second receiver is one of (a) hingedly integral with the wall of the housing or (b) hingedly coupled to the wall of the housing.

14. The method of claim 9 wherein:

at least one of the first receiver or the second receiver is configured to operate as a stand for the case when at least one of (a) the first receiver is in the first active position or (b) the second receiver is in the second active position.

15. The method of claim 9 wherein at least one of:

the housing comprises a centerline length and a centerline width, and the first receiver and the second receiver are symmetric about and equidistant to the centerline length of the housing; or the housing comprises a material, and the material comprises at least one of thermoplastic polyurethane, silicone, polycarbonate, acrylonitrile butadiene styrene, aluminum, iron, leather, synthetic leather, or woven fabric.

16. A method for storing an electrical cable at a housing of a case for an electronic device, the electronic device being configured to receive an electrical connector of the electrical cable at an electrical receptacle of the electronic device, the method comprising:

moving a first receiver of the housing of the case for the electronic device from a first inactive position to a first active position, wherein a first interior receiver surface of the first receiver is adjacent to and facing towards the electronic device when the first receiver is in the first inactive position;

after moving the first receiver, moving a second receiver of the housing of the case for the electronic device from a second inactive position to a second active position, wherein a second interior receiver surface of the second receiver is adjacent to and facing towards the electronic device when the second receiver is in the second inactive position; and after moving the first receiver and after moving the second receiver, winding the electrical cable about the first interior receiver surface of the first receiver and about the second interior receiver surface of the second receiver such that the electrical cable is received at the housing.

17. The method of claim 16 further comprising:

coupling the electrical connector to the electrical receptacle of the electronic device.

18. The method of claim 16 further comprising:

supporting the case of the electronic device with at least one of the first receiver or the second receiver such that the at least one of the first receiver or the second receiver operates as a stand for the case, and for the electronic device when the electronic device is located in the case.

19. The method of claim 16 further comprising:

after winding the electrical cable about the first interior receiver surface and the second interior receiver surface, operating the electronic device while the electronic device is located in the case and while the electrical cable remains wound about the first interior receiver surface and the second interior receiver surface.

20. The method of claim 16 wherein at least one of:

moving the first receiver of the housing of the case for the electronic device from the first inactive position to the first active position comprises pivoting the first receiver about a first receiver hinge, the first receiver hinge attaching the first receiver to a wall of the housing, such that at least part of the first receiver is located outside of a first receiver aperture of the housing, the first receiver aperture being configured to receive an entirety of the first receiver when the first receiver is in the first inactive position; or moving the second receiver of the housing of the case for the electronic device from the second inactive position to the second active position comprises pivoting the second receiver about a second receiver hinge, the second receiver hinge attaching the second receiver to the wall of the housing, such that at least part of the second receiver is located outside of a second receiver aperture of the housing, the second receiver aperture being configured to receive an entirety of the second receiver when the second receiver is in the second inactive position.

* * * * *